United States Patent
Steinmetz et al.

(10) Patent No.: US 7,219,000 B2
(45) Date of Patent: May 15, 2007

(54) SPEED CONTROL FOR AN ELECTRICALLY VARIABLE TRANSMISSION

(75) Inventors: Todd M Steinmetz, Indianapolis, IN (US); Anthony H. Heap, Indianapolis, IN (US); Gregory A. Hubbard, Brighton, MI (US); Jy-Jen F. Sah, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 267 days.

(21) Appl. No.: 10/686,511

(22) Filed: Oct. 14, 2003

(65) Prior Publication Data

US 2005/0080535 A1    Apr. 14, 2005

(51) Int. Cl.
*G06F 7/00*    (2006.01)

(52) U.S. Cl. .............. 701/51; 701/68; 477/77; 477/79

(58) Field of Classification Search ........... 701/51, 701/67, 68; 477/70, 77, 78, 79, 62, 65; 475/269, 475/278
See application file for complete search history.

(56) References Cited

U.S. PATENT DOCUMENTS

| | | | | |
|---|---|---|---|---|
| 5,637,987 | A * | 6/1997 | Fattic et al. | 322/40 |
| 5,931,757 | A | 8/1999 | Schmidt | |
| 6,506,140 | B1 * | 1/2003 | O'Neil et al. | 477/62 |
| 6,819,997 | B2 * | 11/2004 | Buchanan et al. | 701/67 |
| 2004/0043856 | A1 * | 3/2004 | Xiaolan | 475/5 |

* cited by examiner

*Primary Examiner*—Gertrude A. Jeanglaude
(74) *Attorney, Agent, or Firm*—Dan L. Thompson (57) ABSTRACT

A multi-mode hybrid transmission has speed control provided via an open loop model derived as a function of preselected transmission accelerations and controlled and uncontrolled transmission torques. Motor torques are selected as the controlled torques and other preselected transmission torques are selected as the uncontrolled torques. The control also employs a closed loop control effort responsive to at least one preselected transmission speed error.

27 Claims, 9 Drawing Sheets

SPEED CONTROL FOR AN ELECTRICALLY VARIABLE TRANSMISSION

TECHNICAL FIELD

The present invention is related to control of a dual-mode hybrid transmission. More particularly, the invention is concerned with the speed control of selected transmission members.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Control of speeds within a multi-mode, compound split, electro-mechanical transmission is a basic operational requirement. When torque transmitting devices or clutches are engaged and disengaged, the number of degrees of freedom changes within the transmission. In an exemplary two-mode, compound-split, electromechanical transmission, during a neutral operation, there are three degrees of freedom where the vehicle speed defines one degree of freedom and the transmission control can control two other transmission speeds. During either of two modes of operation the transmission has two degrees of freedom where the vehicle speed defines one degree of freedom and the transmission control can control one other transmission speed. During a fixed-ratio operation, which is characterized by clutch applications effecting direct mechanical coupling of the input to the output, the transmission has one degree of freedom wherein the vehicle speed defines that degree of freedom and the transmission control cannot control any other transmission speed, and hence no speed control is necessary.

SUMMARY OF THE INVENTION

The present invention controls speeds in a multi-mode hybrid transmission in accordance with an open loop model derived as a function of preselected transmission accelerations and controlled and uncontrolled transmission torques. Motor torques are selected as the controlled torques and other preselected transmission torques are selected as the uncontrolled torques. The control also employs a closed loop control effort responsive to at least one preselected transmission speed error.

A multi-mode, compound-split, electromechanical transmission includes an input member coupled to a prime mover, a pair of planetary gear sets, a pair of motors, a pair of clutches, a first mode of operation selectively enabled by the application of a first one of said pair of clutches, a second mode of operation selectively enabled by the application of a second one of said pair of clutches, a third mode of operation selectively enabled by the simultaneous release of said pair of clutches which the output member is selectively decoupled from the transmission by, and an output member.

In accordance with one aspect of the invention, a transmission speed control includes an open loop motor torque controller operative to control a preselected transmission speed to a target speed as a predetermined function of preselected transmission torques and accelerations and at least one closed loop effort operative to act upon a predetermined transmission speed error.

In accordance with another aspect of the invention a model including controlled and uncontrolled external torques and preselected transmission accelerations of the transmission corresponding to an active one of the modes is provided. Values for uncontrolled external torques into the mode model are also provided. Values for said preselected transmission accelerations are similarly provided into the model. The model is resolved for values of controlled external torques for application to the transmission. A closed loop effort acting upon at least one predetermined transmission member speed error may also be employed. The number of transmission speed errors encompassed by the closed loop effort depends upon the active mode of operation and corresponding number of degrees of freedom of the transmission.

DESCRIPTION OF THE PREFERRED EMBODIMENT

Figure 1:
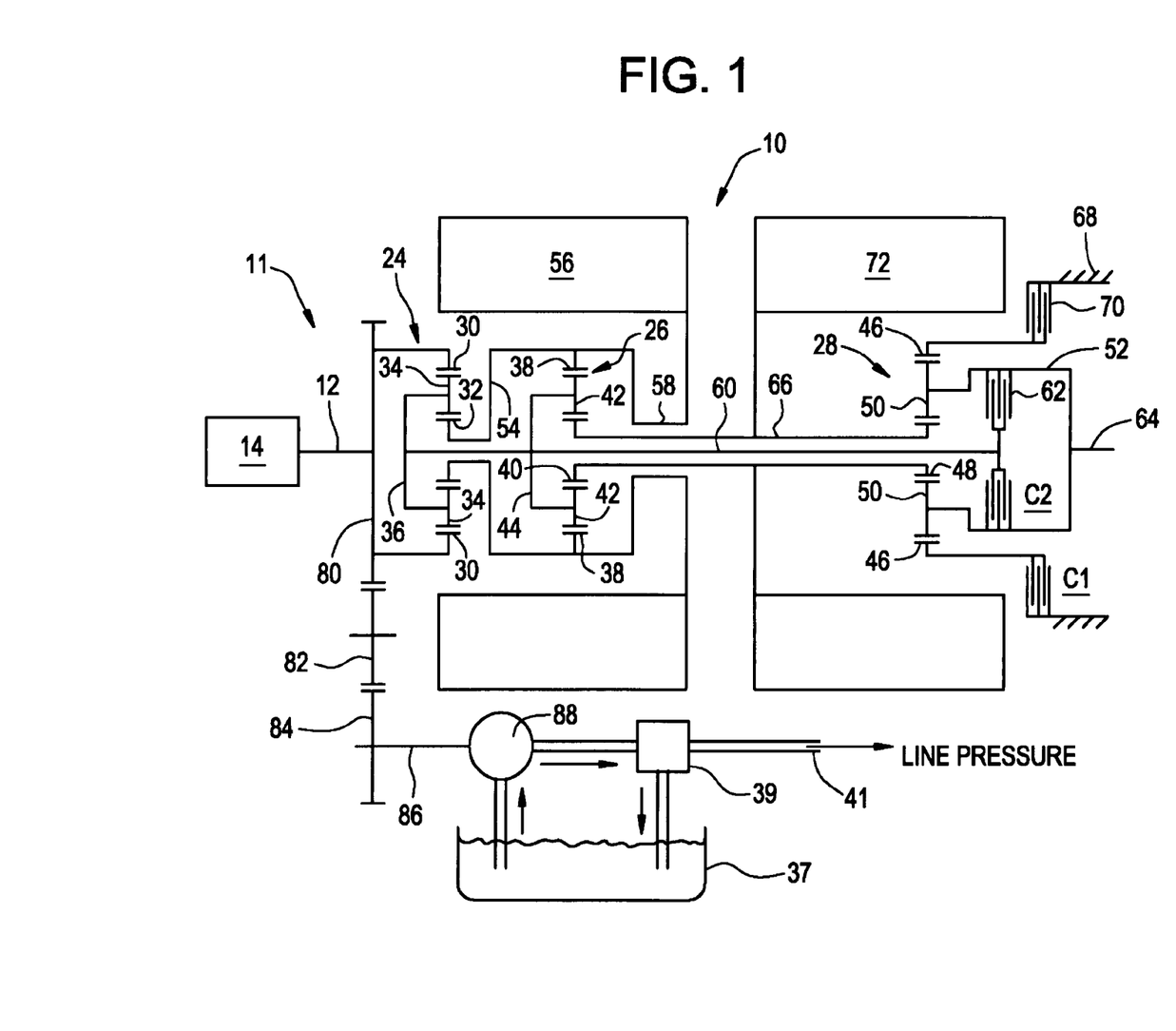
FIG. 1 is a mechanical hardware schematic representation of one preferred form of a two-mode, compound-split, electrically variable transmission particularly suited to the control of the present invention.
Figure 2:
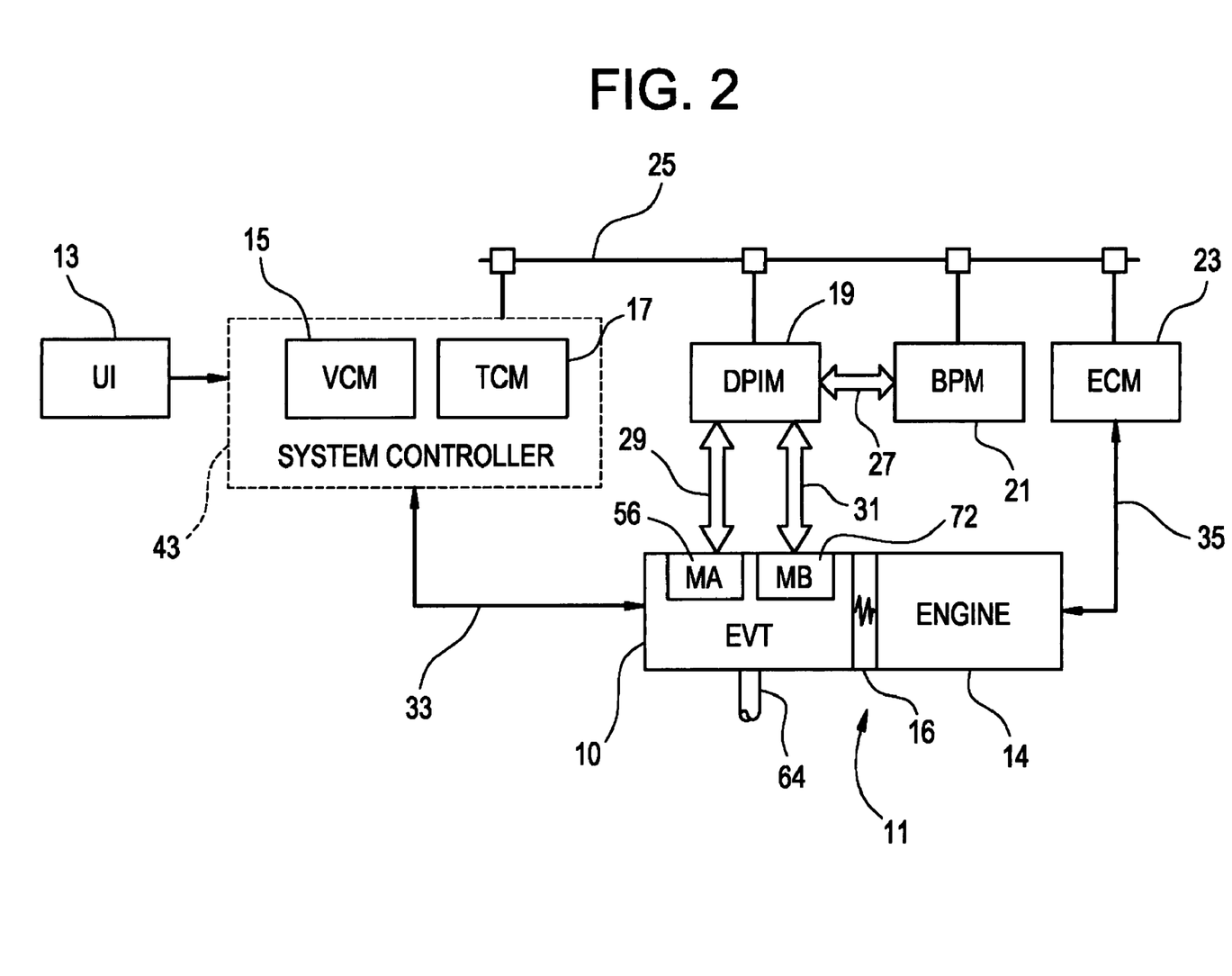
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 land provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
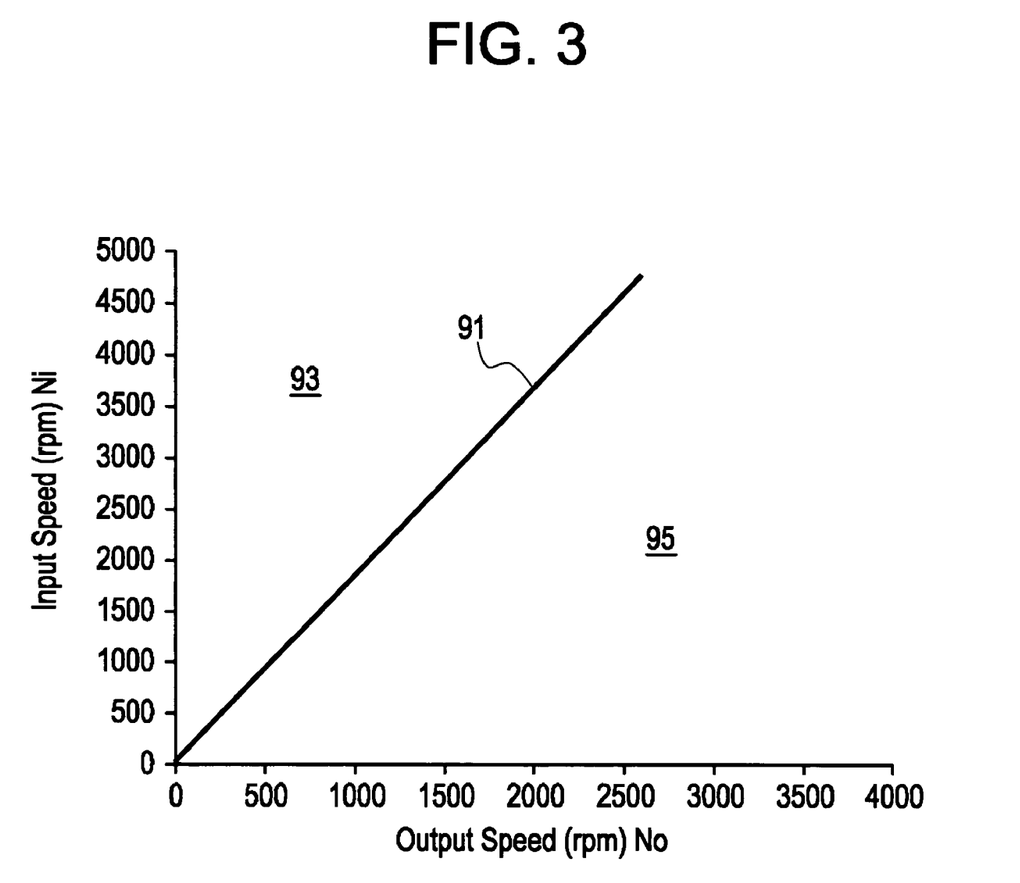
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

For transmission speed control during MODE 1 and MODE 2 the dynamic equations for the EVT are determined using Newton's law applicable to rotating bodies:

$$N\_dot = (1/J) * Tsum$$

where
  N_dot is rotational acceleration;
  J is rotational inertia; and,
  Tsum is summation of external torques acting upon inertia J.

In the exemplary EVT the following matrix equations, determined using Newton's law for each independent free body diagram, correspond to MODE 1 and MODE 2, respectively:

$$[Ni\_dot\ No\_dot]^T = [A1] * [Ti\ Ta\ Tb\ To]^T$$

$$[Ni\_dot\ No\_dot]^T = [A2] * [Ti\ Ta\ Tb\ To]^T$$

where
  Ni_dot is input member acceleration;
  No_dot is output member acceleration;
  Ti is externally applied input member torque;
  Ta is externally applied motor A torque;
  Tb is externally applied motor B torque;
  To is externally applied output member torque; and,
  A1 and A2 are 2×4 matrices of parametric values determined by the hardware gear and shaft interconnections and estimated hardware inertias applicable to MODE 1 and MODE 2, respectively.

Other different independent member accelerations may be substituted for those shown above to arrive at similar matrix equations. Ni_dot and No_dot are selected as expedient since both input and output speed are quantities of general interest in other areas of the transmission and vehicle controls.

The matrix equation form is identical for MODE 1 and MODE 2. The parametric constants in A1 and A2, however, may differ. Therefore, further references herein to either MODE 1 or MODE 2 shall be equally applicable to the other.

This basic mode model of the system to be controlled provides the basis for transmission input speed control in accordance with the present invention. For the exemplary EVT, it is preferred to perform input speed control via motor torques Ta and Tb and not via the input torque Ti at the input member or via the output torque To at the output member. Thus, Ti and To are both considered as external input or disturbance torques not subject to control by the present invention. Therefore, the basic mode model is rearranged into a matrix equation for solving for motor torques Ta and Tb as follows:

$$[Ta\ Tb]^T = [B1]*[Ti\ To\ Ni\_dot\ No\_dot]^T$$

where B1 is a 2×4 matrix of parametric values determined by the hardware gear and shaft interconnections and estimated hardware inertias applicable to MODE 1 and represents what is commonly referred to as the plant model.

This modified mode model is utilized in the EVT speed control of the present invention. The motor torque commands are calculated based upon the plant dynamic model parameters, B1, and specially formulated inputs (Ti, To, Ni_dot, No_dot) to the model. The choices of application for each of these specially formulated inputs are described below.

Figure 4:
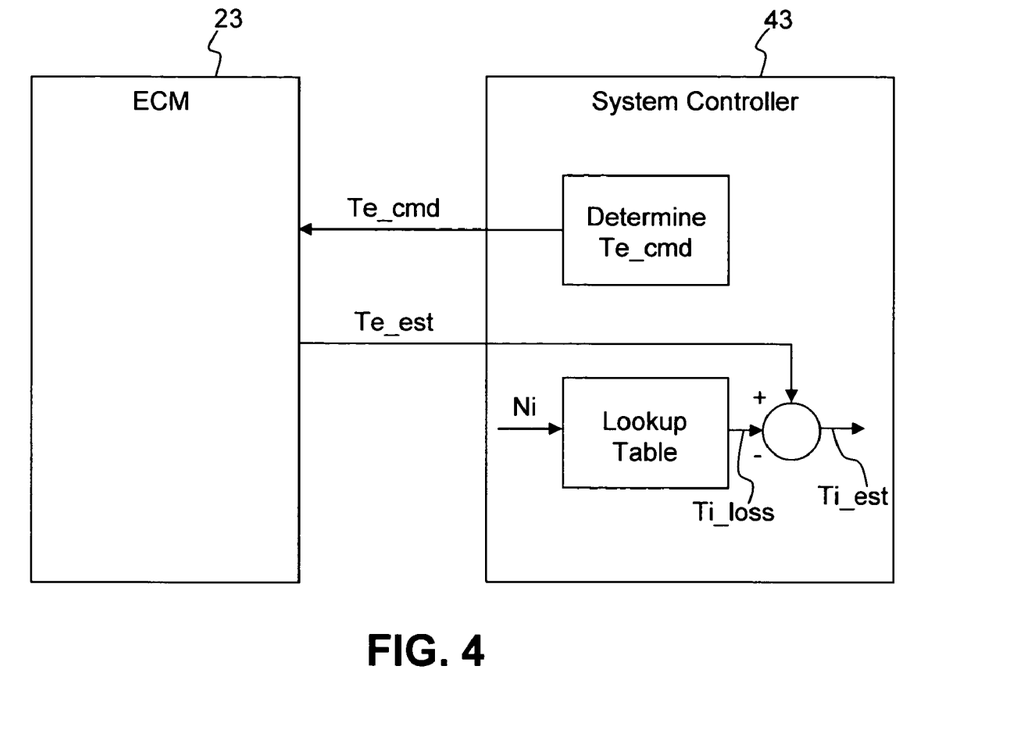
FIG. 4 is a block diagram of EVT input member torque estimation for use in the input speed control of the present invention.

The preferred implementation for input member torque Ti is to provide an estimated input torque, Ti_est, for Ti. FIG. 4 provides a block diagram of the method by which estimated input torque Ti_est is determined. An engine torque command, Te_cmd is provided to ECM 23 by the system controller 43. The ECM 23 then provides an estimate of the actual engine torque produced, Te_which is provided to the system controller 43. The system controller 43 then calculates an estimate of torque losses to the input member, Ti_loss, through the use of an empirically defined lookup table which is a function of input member speed, Ni. These empirically defined losses represent reductions in torque produced by the engine due to friction, transmission pump losses, engine driven accessories, etc. The engine's estimate of torque produced is then reduced by the loss estimate to calculate the estimated input torque, Ti_est. Through Ti_est, Ta and Tb are calculated in such a manner as to account for and counteract the effects of estimated transmission input torque on transmission input speed.

The preferred implementation for output member torque To is to provide a desired output torque to be produced by the transmission, To_des for To. In the modified model utilized in the EVT input speed control of the present invention To is considered an external torque acting upon the output member. The external output torque is assumed equal and opposite to the EVT produced output torque and hence To is equated to To_des. The determination of To_des is made based upon several factors such as driver inputs of accelerator pedal position, brake pedal position, shift selector position; vehicle dynamic conditions such as acceleration rate or deceleration rate; EVT operational conditions such as temperatures, voltages, currents and speeds. Through To, Ta and Tb are calculated in such a manner as to produce the desired transmission output torque.

Figure 5:
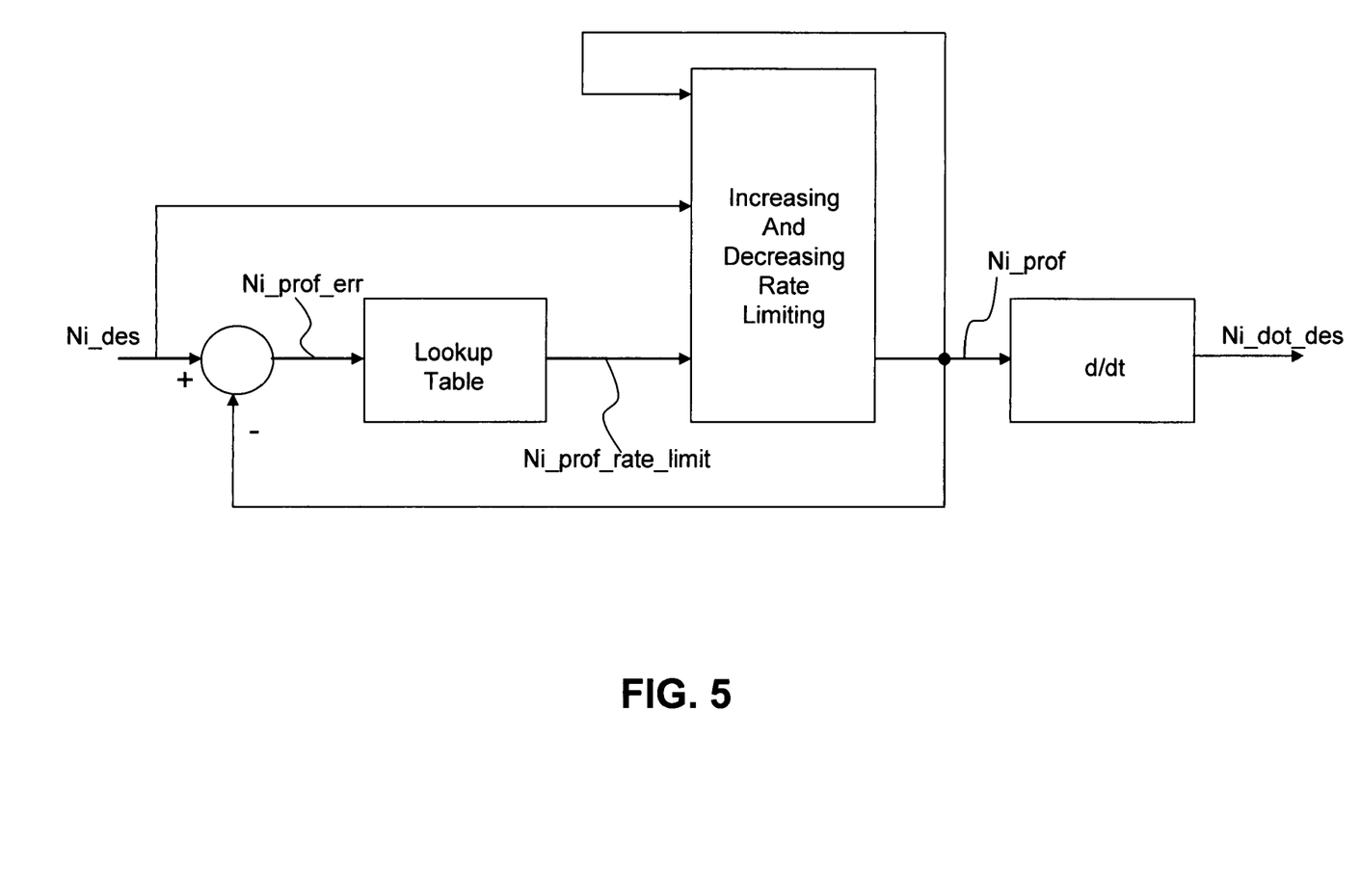
FIG. 5 is a block diagram of EVT input member speed profile determination and desired input member acceleration determination for use in the input speed control of the present invention.

The preferred implementation for input member acceleration Ni_dot is to provide a desired rate of change of transmission input speed Ni_dot_des, for Ni_dot. Given a desired transmission input speed, Ni_des, a transmission input speed trajectory is determined, called an input speed profile, Ni_prof. Desired input speed is provided by the system controller, for example in accordance with a desired operating point of the engine to meet various efficiency and emission objectives. A preferred method of determining input speed is disclosed in commonly assigned and co-pending U.S. Ser. Nos. 10/686,508 and 10/686,034 which are incorporated herein by reference. The method by which Ni_prof is determined is shown in FIG. 5. The present value of the trajectory, Ni_prof is subtracted from the desired speed, Ni_des to obtain an input speed profile error, Ni_prof_err. This error is then used in a lockup table to determine the allowable rate of change for the input speed profile, Ni_prof_rate_limit. The values used within the lockup table are empirically determined based upon objective and subjective criteria such as system responsiveness capability, noise and vibration due to changes in engine operating speed, vehicle stability, and effects on engine operating characteristics such as fuel economy and emissions that may be related to the change rate of engine operation. In general, it is desirable to allow a higher rate of change, Ni_prof_rate_limit, for a larger error, Ni_prof_err. Then the present value of the profile, Ni_prof, the desired final value of the profile, Ni_des and the allowable rate of change, Ni_prof_rate_limit, are inputs to a rate limiter. This rate limiter allows the value of the profile, Ni_prof, to be modified in the direction of the final value Ni_des, at a rate that is no faster than the rate limit, Ni_prof_rate_limit, until the profile, Ni_prof, becomes equal to the desired value, Ni_des. The derivative with respect to time of Ni_prof is then taken to determine the desired rate of change of transmission input speed, Ni_dot_des. Through Ni_dot, Ta and Tb are calculated in such a manner as to cause transmission input speed to change at a desired rate, Ni_dot_des.

The preferred implementation for output member acceleration No_dot is to provide a calculated output member acceleration, No_dot_calc, for No_dot. No_dot_calc is calculated as follows:

$$No\_dot\_calc = Filter[d(No)/dt]$$

by taking the derivative of measured EVT output member speed, No, with respect to time and then applying a filter to this derivative to eliminate large disturbances from the calculation. Through No_dot, Ta and Tb are calculated in such a manner as to compensate the transmission output torque produced for measured transmission output accelerations and hence vehicle accelerations. This term compensates for wind resistance, application of vehicle friction brakes, road gradation, and other vehicle load torque conditions which cannot be adequately predicted.

With the substitution of these parameters into the basic mode model, the implementation model is realized and takes the form of the matrix equation represented below for MODE 1:

$$[Ta\ Tb]^T = [B1]*[Ti\_est\ To\_des\ Ni\_dot\_des\ No\_dot\_calc]^T$$

This implementation model provides the open loop control portion of the present invention with respect to the two modes. Innate errors in the system make a closed loop control portion desirable to further improve control accuracy. As such, a closed loop control portion is added to the open loop control portion provided by the implementation model as follows:

$$[Ta\ Tb]^T = [B1]*[Ti\_est\ To\_des\ Ni\_dot\_des\ No\_dot\_calc]^T + [k1\ k2]^T * u$$

where
- k1 and k2 formulate a vector gain matrix for modifications of Ta and Tb; and
- u is the desired closed loop control effort.

Figure 6:
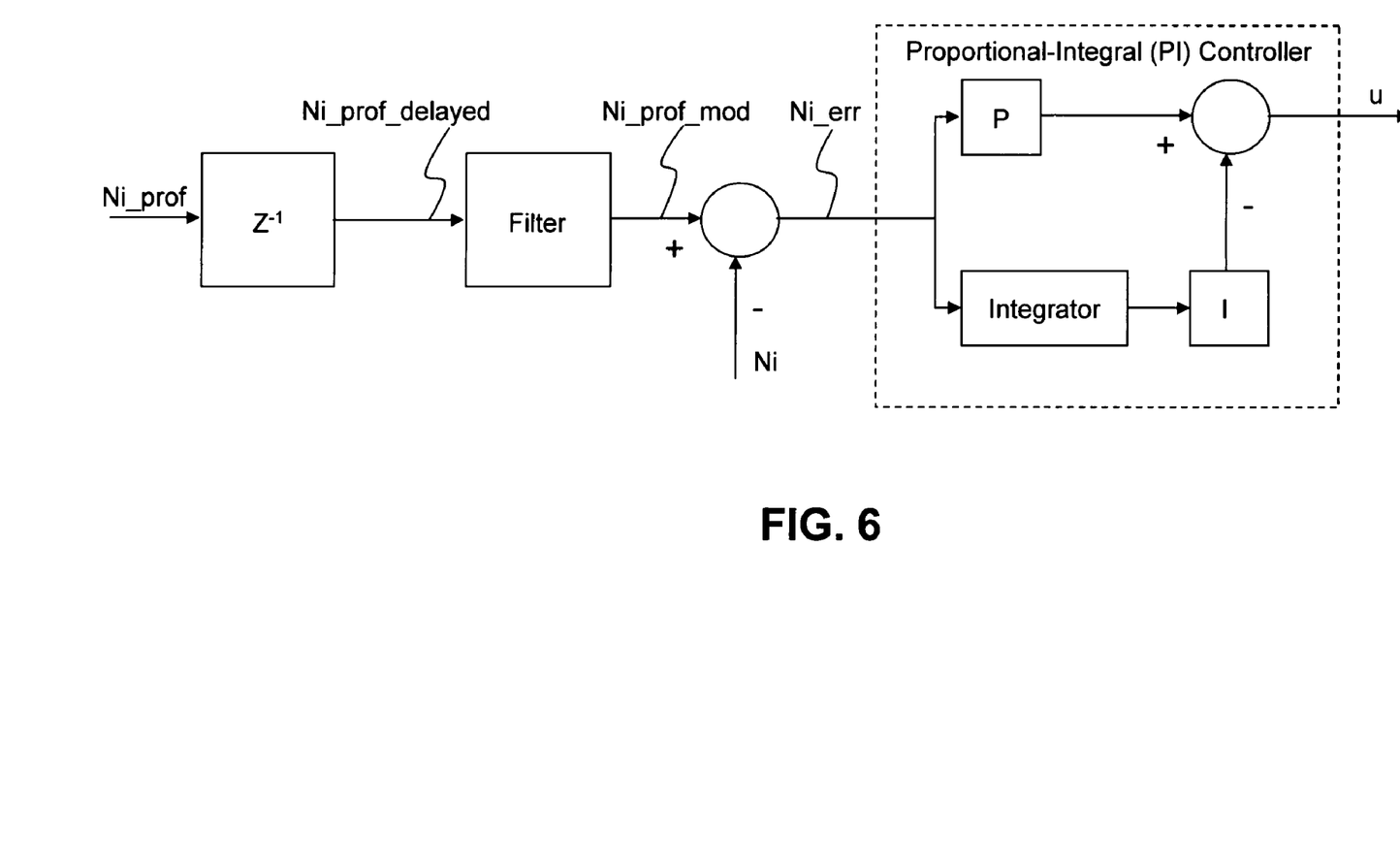
FIG. 6 is a block diagram of closed loop input member speed error determination and closed loop control effort determination for use in the input speed control of the present invention corresponding to a mode.
Figure 7:
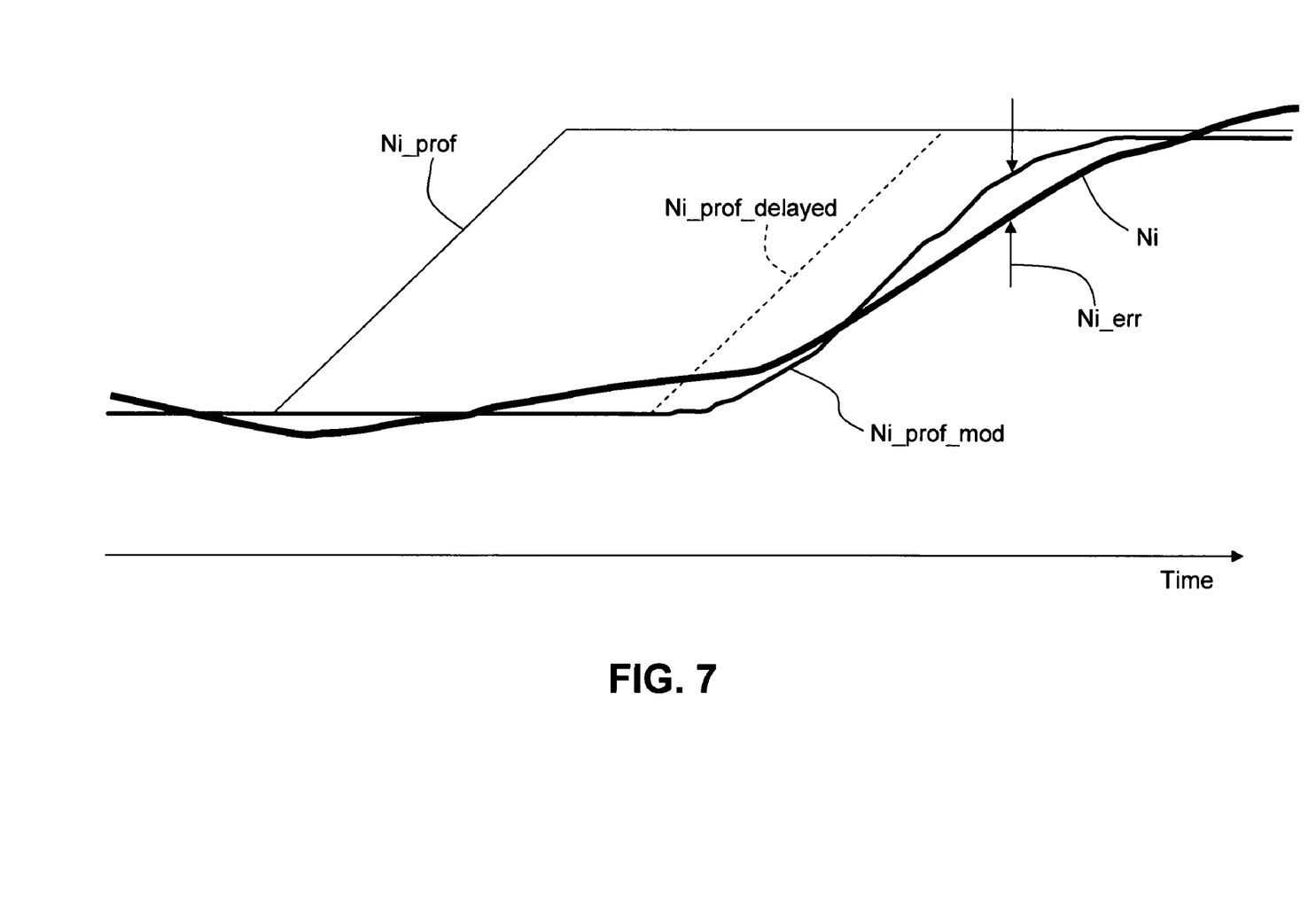
FIG. 7 is a graphical representation of the closed loop input member speed error determination and closed loop control effort determination illustrated in FIG. 6.

With reference to FIG. 6, the desired closed loop control effort, u, is determined by applying a Proportional-Integral (PI) controller to a calculated error in EVT input member speed, Ni_err, where Ni_prof is the reference as described. However, in the exemplary system described, it is foreseeable that significant inflection points and rapid changes may be commanded in the control system reference. As such, during the transient response the actual system may lag substantially behind the reference causing an error for an extended period of time. Such extended error would cause the closed loop to overcompensate such that when the reference reaches its new steady state value, the control system would cause an undesirable overshoot in the response of the torque commands to the motors. To address this situation, a modified input speed profile, Ni_prof_mod, is developed as the reference for the comparison of the feedback parameter, Ni as described below and with continued reference to FIG. 6 and additional reference to FIG. 7. A time delayed signal of the transmission input speed profile, Ni_prof, is created called Ni_prof_delayed. This time delayed signal is then passed through a filter to produce the modified input speed profile, Ni_prof_mod. The input speed error upon which the closed loop action is to occur, Ni_err, is then calculated by taking the difference between the modified input speed profile, Ni_prof_mod, and the actual input speed, Ni. The intent of the time delay and filter is to produce a profile that would be similar in nature to the open loop response of the system to Ni_prof and minimize the closed loop action required during the transient condition. Therefore, the parametric values (i.e. calibrations) selected for the time delay, the selection of the filter type, and the filter parametric values will be chosen in a fashion such that Ni_prof_mod will most nearly match the open loop response of the system to changes in Ni_prof.

Figure 8:
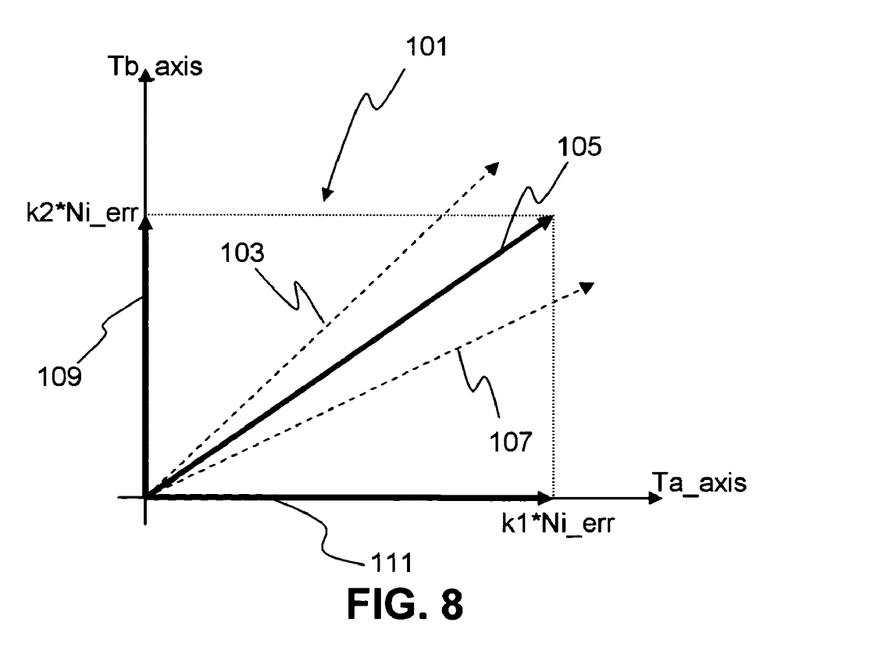
FIG. 8 is a graphical representation of closed loop gain determinations for use in the input speed control of the present invention; and, FIG. 9 is a block diagram of EVT clutch slip speed profile determination and desired clutch slip acceleration determination for use in the input speed control of the present invention.

With reference now to FIG. 8, the gains k1 and k2 form the basis for a vector in the plane of Ta and Tb space 101. This allows for independent placement of the closed loop gain action. In the ideal sense, the placement of this closed loop action would be a vector placed in the same direction as the vector for Ni_dot 103, since this is the direct action desired for an error in Ni. There is a theoretical value for the Ni_dot component 107 in the A1 matrix of values which is one possible placement of values for k1 and k2. However, due to modeling errors from such factors as unmodeled frictions or inertia value inaccuracies, the placement for k1 and k2 may be better determined through tuning of the gains through empirical calibration methods resulting in the tuned Ni_dot vector 105 an the resolved Ta vector 111 and resolved Tb vector 109.

For transmission speed control during neutral operation, the following matrix equation, determined using Newton's law for the set of free body diagrams, corresponds thereto:

$$[Ni\_dot \ No\_dot \ Nc1\_dot]^T = [A3]^*[Ti \ Ta \ Tb]^T$$

where:

Ni_dot is input member acceleration;
No_dot is output member acceleration;
Nc1_dot is clutch 1 acceleration which is defined as the derivative with respect to time of the difference in speed between the two sides of clutch 1 (shown in FIG. 1 as outer gear member 46 and transmission housing 68);

Ti is externally applied input member torque;
Ta is externally applied motor A torque;
Tb is externally applied motor B torque; and,
A3 is a 3×3 matrix of parametric values determined by the hardware gear and shaft interconnections and estimated hardware inertias applicable to the neutral state.

Other different independent member accelerations may be substituted for those shown above to arrive at similar matrix equations. Ni_dot and No_dot are selected as expedient since both input and output speed are quantities of general interest in other areas of the transmission and vehicle controls.

In this neutral model there is no output torque term, To, since in neutral operation the transmission is incapable of transmitting torque to the transmission output member. Also, with the release of an additional clutch, there is one additional degree of freedom within the mechanical system relative to the number of degrees of freedom in MODE 1 or MODE 2. This additional degree of freedom results in the additional term for clutch 1 acceleration Nc1_dot in the neutral model.

Based upon this neutral model of the system, simultaneous transmission input speed control and clutch slip speed control through the use of motor torques Ta and Tb is accomplished. In MODE 1, clutch slip speed control was unnecessary since the engaged clutch was the controlling input for clutch slip speed control. Therefore, the basic neutral model is rearranged into a matrix equation for solving for motor torques Ta and Tb as follows:

$$[Ta \ Tb]^T = [B3]^*[Ti \ Ni\_dot \ No\_dot \ Nc1\_dot]^T$$

where B3 is a 2×4 matrix of parametric values determined by the hardware gear and shaft interconnections and estimated hardware inertias applicable to the neutral state and represents the plant model for the neutral state.

This modified neutral model is utilized in the EVT speed control of the present invention. The motor torque commands are calculated based upon the plant dynamic model parameters, B3, and specially formulated inputs (Ti, Ni_dot, No_dot, Nc1_dot) to the model. The choices of application for each of these specially formulated inputs are described below.

The preferred implementation for input member torque Ti is to provide an estimated input torque, Ti_est. Similarly, the preferred implementation for Ni_dot is to provide a desired rate of change of transmission input speed, Ni_dot_des. And, the preferred implementation for output member acceleration No_dot is to provide a calculated output member acceleration, No_dot_calc, for No_dot. Ti_est, Ni_dot_des and No_dot are determined in the same manner as previously described for the mode model.

The preferred implementation for Nc1_dot is to provide a desired rate of change of clutch 1 slip speed, Nc1_dot_des, for Nc1_dot. Given a desired clutch C1 slip speed, Nc1_des, a clutch 1 slip speed trajectory is determined, called a clutch slip profile, Nc1_prof. Nc1_des is set to a near zero constant value when the preferred mode of operation is MODE 1—such as when input/output speed relationship is mapped in region 93 of FIG. 3—so that the transmission is prepared to quickly perform a neutral to MODE 1 shift upon the driver request to do so (e.g. vis-à-vis selection of range operation on the PBSS). When the preferred mode of operation is MODE 2—such as when input/output speed relationship is mapped in region 95 of FIG. 3—Nc1_des is calculated in a manner that will cause the slip speed of the MODE 2 clutch C2 to be at a near zero constant value so that the transmission is prepared to quickly perform a neutral to MODE 2 shift upon the driver request to do so. This calculation for Nc1_des at higher vehicle speeds is performed in accordance with the following equation:

$$Nc1\_des = [C3] * [Ni\ No\ Nc2\_des]^T$$

where
- Nc2_des is a constant near zero value so that the clutch 2 slip speed is to be maintained to a near zero value; and,
- C3 is a 1×3 matrix of parametric values determined by the hardware gear and shaft interconnections applicable to the neutral state.

Figure 9:
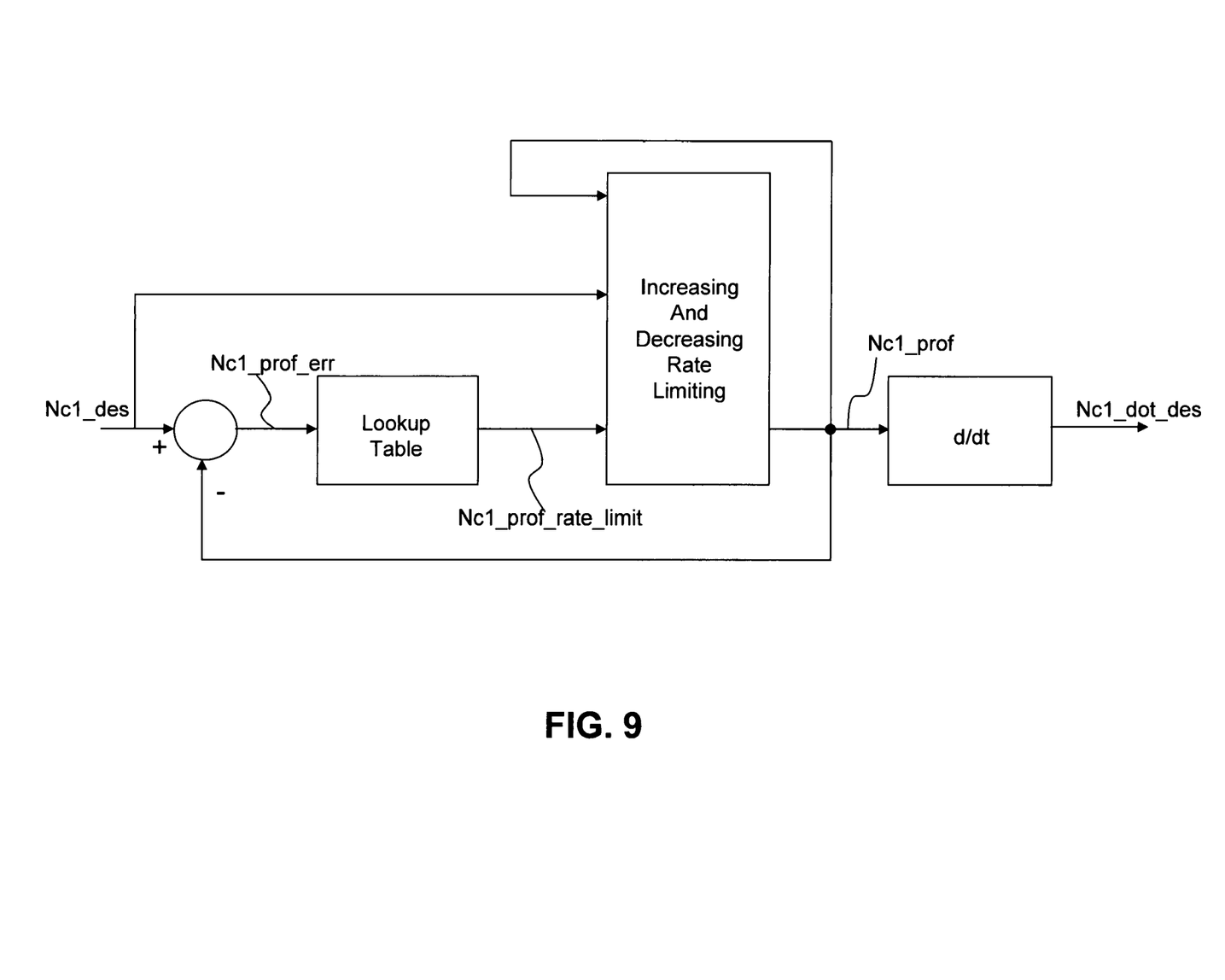

Given the above determinations of Nc1_des, the method by which Nc1_dot_des is determined is identical to the above method of determining Ni_dot_des from Ni_des, to wit, given a desired C1 slip speed, Nc1_des, a slip speed trajectory is determined, called C1 slip speed profile, Nc1_prof. The present value of the trajectory, Nc1_prof is subtracted from the desired C1 slip speed, Nc1_des to obtain a slip speed profile error, Nc1_prof_err. This error is then used in a lookup table to determine the allowable rate of change for the slip speed profile, Nc1_prof_rate_limit. The values used within the lookup table are empirically determined based upon objective and subjective criteria such as system responsiveness, stability, torque capability, and coupling effects on input speed control. In general, it is desirable to allow a higher rate of change, Nc1_prof_rate_limit, for a larger error, Nc1_prof_err. Then the present value of the profile, Nc1_prof, the desired final value of the profile, Nc1_des, and the allowable rate of change, Nc1_prof_rate_limit, are inputs to a rate limiter. This rate limiter allows the value of the profile, Nc1_prof, to be modified in the direction of the final value, Nc1_des, at a rate that is no faster than the rate limit, Nc_prof_rate_limit, until the profile, Nc1_prof, becomes equal to the desired value, Nc1_des. The derivative with respect to time of Nc1_prof is then taken to determine the desired rate of change of C1 slip speed, Nc1_dot_des. Through Nc1_dot, Ta and Tb are calculated in such a manner as to cause clutch 1 slip speed to change at a desired rate, Nc1_dot_des.] The process described is shown in FIG. 9.

With the substitution of these parameters into the basic neutral model, the implementation model is realized and takes the form of the matrix equation represented below for the neutral state:

$$[Ta\ Tb]^T = [C3] * [Ti\_est\ Ni\_dot\_des\ No\_dot\_calc\ Nc1\_dot\_des]^T$$

This implementation model provides the open loop control portion of the present invention with respect to the neutral state. Innate errors in the system make a closed loop control portion desirable to further improve control accuracy. As such, a closed loop control portion is added to the open loop control portion provided by the implementation model as follows:

$$[Ta\ Tb]^T = [D3] * [Ti\_est\ Ni\_dot\_des\ No\_dot\_calc\ Nc1\_dot\_des]^T + [k1n\ k2n]^T * u1 + [k3n\ k4n]^T * u2$$

where k1n and k2n formulate a vector gain matrix for modifications of Ta and Tb in an identical fashion to that described above for the mode model, and where k3n and k4n formulate a vector gain matrix for modifications of Ta and Tb based upon an error between the measured C1 slip speed and the trajectory for C1 slip speed. The method by which u1 is computed is identical to the calculation of u for the mode model described previously. The method by which u2 is computed is identical to that of u1 except that all calculations are based upon the C1 slip speed instead of the transmission input slip speed.

Figure 10:
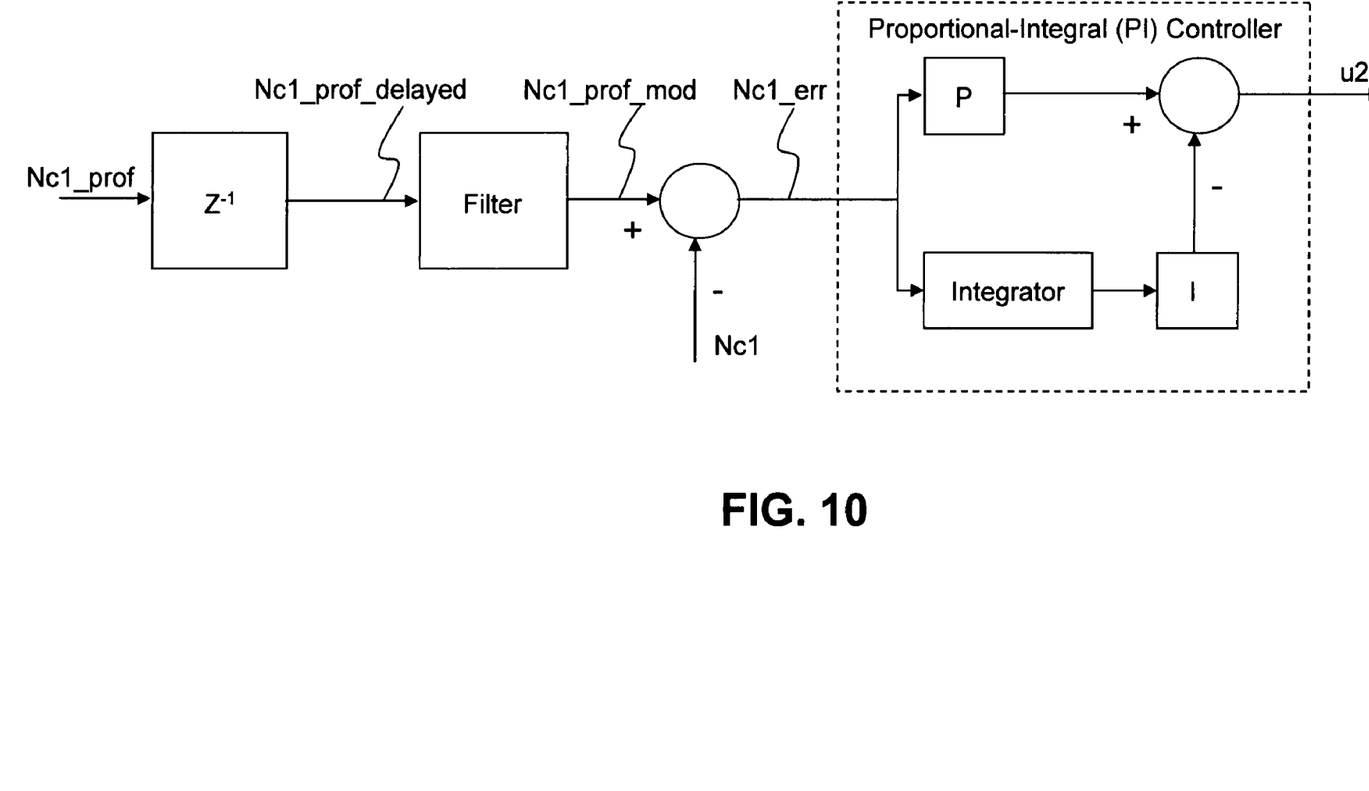
FIG. 10 is a block diagram of closed loop clutch slip speed error determination and closed loop control effort determination for use in the input speed control of the present invention corresponding to a neutral state.

With reference to FIG. 10, a time delayed signal of the clutch slip speed profile, Nc1_prof, is created called Nc1_prof_delayed. This time delayed signal is then passed through a filter to produce the modified clutch slip speed profile, Nc1_prof_mod. The time delay and filter is to produce a profile that would be similar in nature to the open loop response of the system to Nc1_prof and minimize the closed loop action required during the transient condition. The modified clutch slip speed profile, Nc1_prof_mod, is the reference for the comparison of the feedback parameter, Nc1. The clutch slip speed error upon which the closed loop action is to occur, Nc1_err, is calculated by taking the difference between the modified input speed profile, Nc1_prof_mod, and the actual clutch slip speed, Nc1. Therefore, the parametric values (i.e. calibrations) selected for the time delay, the selection of the filter type, and the filter parametric values will be chosen in a fashion such that Nc1prof_mod will most nearly match the open loop response of the system to changes in Nc1_prof. The desired closed loop control effort, u2, is determined by applying a Proportional-Integral (PI) controller to the calculated error in clutch slip speed as described.

As in the mode model, the pair of gains k1n and k2n form the basis for a vector in the plane of Ta and Tb space. In neutral operation, the gains k3n and k4n form an additional vector in the plane of Ta and Tb space. As in the mode model, the placement of the vector $[k1n\ k2n]^T$ would best be placed in the same direction as the vector for Ni_dot, while the placement of the vector $[k3n\ k4n]^T$ would best be placed in the same direction as the vector for Nc1_dot. However, coupling between the two vectors is an additional consideration in the neutral model. If these vectors are perpendicular to one another, then the coupling is eliminated. However, any non perpendicular placement of these vectors will result in coupling so that a correction for a C1 slip speed error will calculate a value for Ta and Tb that will also affect transmission input speed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Speed control for a multi-mode, electro-mechanical transmission including an input member coupled to a prime mover, at least one planetary gear set, at least one motor, at least one torque transfer device, a plurality of operating states and an output member, comprising:
   an open loop motor torque controller operative to control a preselected transmission speed to a target speed as a predetermined function of preselected transmission torques and accelerations.

2. The speed control as claimed in claim 1 further comprising at least one closed loop effort operative to act upon a predetermined transmission speed error.

3. The speed control as claimed in claim 1 wherein said plurality of operating states includes a first state effective to operatively couple the input to the output through a first gear set, a second state effective to operatively couple the input to the output through a second gear set, a third state effective to operatively decouple the output from the transmission, and further wherein when one of said first and second states is operative said preselected transmission member torques comprise input member torque and output member torque, and said preselected transmission accelerations comprise input member acceleration and output member acceleration.

4. The speed control as claimed in claim 2 wherein said plurality of operating states includes a first state effective to operatively couple the input to the output through a first gear set, a second state effective to operatively couple the input to the output through a second gear set, a third state effective to operatively decouple the output from the transmission, and further wherein when one of said first and second states is operative said preselected transmission member torques comprise input member torque and output member torque, and said preselected transmission accelerations comprise input member acceleration and output member acceleration.

5. The speed control as claimed in claim 1 wherein said plurality of operating states includes a first state effective to operatively couple the input to the output through a first gear set, a second state effective to operatively couple the input to the output through a second gear set, a third state effective to operatively decouple the output from the transmission, and further wherein when said third State is operative said preselected transmission member torques comprise input member torque, and said preselected transmission accelerations comprise input member acceleration, output member acceleration and slip speed acceleration across at least one torque transfer device.

6. The speed control as claimed in claim 2 wherein said plurality of operating states includes a first state effective to operatively couple the input to the output through a first gear set, a second state effective to operatively couple the input to the output through a second gear set, a third state effective to operatively decouple the output from the transmission, and further wherein when said third state is operative said preselected transmission member torques comprise input member torque, and said preselected transmission accelerations comprise input member acceleration, output member acceleration and slip speed acceleration across at least one torque transfer device.

7. Method for controlling transmission member speed in a multi-mode, electro-mechanical transmission including an input member coupled to a prime mover, at least one planetary gear set, at least one motor, at least one torque transfer device, a plurality of operating states and an output member, comprising:
providing a model of the transmission corresponding to an active one of said plurality of operating states, said model including controlled and uncontrolled external torques and preselected transmission accelerations;
providing values for said uncontrolled external torques into the model;
providing values for said preselected transmission accelerations into the model;
solving the model for values of said controlled external torques; and,
applying torque to the transmission in accordance with said values for said controlled external torques.

8. The method for controlling transmission member speed as claimed in claim 7 further comprising providing for closed loop effort acting upon at least one predetermined transmission member speed error.

9. The method for controlling transmission member speed as claimed in claim 8 wherein the closed loop effort acts upon a number of transmission member speed errors related to the number of degrees of freedom of the transmission in the active one of said plurality of said operating states.

10. The method for controlling transmission member speed as claimed in claim 8 wherein said plurality of operating states includes a first state effective to operatively couple the input to the output through a first gear set, a second state effective to operatively couple the input to the output through a second gear set, a third state effective to operatively decouple the output from the transmission, the active one of said plurality of operating states is one of said first and second states and the closed loop effort acts upon input member speed error.

11. The method for controlling transmission member speed as claimed in claim 8 wherein said plurality of operating states includes a first state effective to operatively couple the input to the output through a first gear set, a second state effective to operatively couple the input to the output through a second gear set, a third state effective to operatively decouple the output from the transmission, the active one of said plurality of operating states is said third state and the closed loop effort acts upon input member speed error and slip speed error across at least one torque transfer devices.

12. Method for controlling transmission member speed in a multi-mode, electro-mechanical transmission including an input member coupled to a prime mover, said transmission further including a pair of planetary gear sets, a pair of motors, a pair of torque transfer devices for selectively activating one of said two modes, and an output member, comprising:
providing a mode model of the transmission corresponding to an active one of said modes, said mode model including controlled and uncontrolled external torques and preselected transmission accelerations;
providing values for said uncontrolled external torques into the mode model;
providing values for said preselected transmission accelerations into the mode model;
solving the mode model for values of said controlled external torques; and,
applying torque to the transmission in accordance with said values for said controlled external torques.

13. The method for controlling transmission member speed as claimed in claim 12 wherein said uncontrolled external torques comprise input and output member torques.

14. The method for controlling transmission member speed as claimed in claim 12 wherein said controlled external torques comprise motor torques.

15. The method for controlling transmission member speed as claimed in claim 13 wherein said controlled external torques comprise motor torques.

16. The method for controlling transmission member speed as claimed in claim 12 wherein said preselected transmission accelerations comprise input and output member accelerations.

17. The method for controlling transmission member speed as claimed in claim 12 wherein said uncontrolled external torques comprise input and output member torques, said controlled external torques comprise motor torques, said preselected transmission accelerations comprise input and output member accelerations, and the torque applied to the transmission in accordance with said values for said controlled external torques is applied via said pair of motors.

18. The method for controlling transmission member speed as claimed in claim 12 further comprising providing a closed loop effort acting upon a predetermined transmission member speed error.

19. The method for controlling transmission member speed as claimed in claim 18 wherein said predetermined transmission member speed error comprises input member speed error.

20. The method for controlling transmission member speed as claimed in claim 12 wherein said transmission further includes a neutral state in which the output member is selectively decoupled from the transmission by simultaneous release of said pair of torque transfer devices, further comprising:
  providing a neutral model of the transmission corresponding to an active neutral state, said neutral model including controlled and uncontrolled external torques and preselected transmission accelerations;
  providing values for said preselected transmission accelerations into the neutral model;
  solving the neutral model for values for said controlled external torques; and,
  applying torque to the transmission in accordance with said values for said controlled external torques.

21. The method for controlling transmission member speed as claimed in claim 20 wherein said neutral mode uncontrolled external torques comprise input member torques.

22. The method for controlling transmission member speed as claimed in claim 20 wherein said neutral mode controlled external torques comprise motor torques.

23. The method for controlling transmission member speed as claimed in claim 21 wherein said neutral mode controlled external torques comprise motor torques.

24. The method for controlling transmission member speed as claimed in claim 20 wherein said neutral mode preselected transmission accelerations comprise input and output member accelerations and a slip speed acceleration of at least one of said pair of torque transfer devices.

25. The method for controlling transmission member speed as claimed in claim 20 wherein said neutral mode uncontrolled external torques comprise input member torque, said neutral mode controlled external torques comprise motor torques, said neutral mode preselected transmission accelerations comprise input and output member accelerations and a slip speed acceleration of at least one of said pair of torque transfer devices, and the torque applied to the transmission in accordance with said values for said neutral mode controlled external torques is applied via said pair of motors.

26. The method for controlling transmission member speed as claimed in claim 20 further comprising providing for the neutral model of the transmission a closed loop effort acting upon predetermined transmission member speed errors.

27. The method for controlling transmission member speed as claimed in claim 26 wherein said predetermined transmission member speed errors comprise input member speed error and slip speed error across one of said pair of torque transfer devices.

* * * * *